E. ST. AUBIN.
PLANTER.
APPLICATION FILED AUG. 29, 1908.
914,890.
Patented Mar. 9, 1909.
4 SHEETS—SHEET 1.
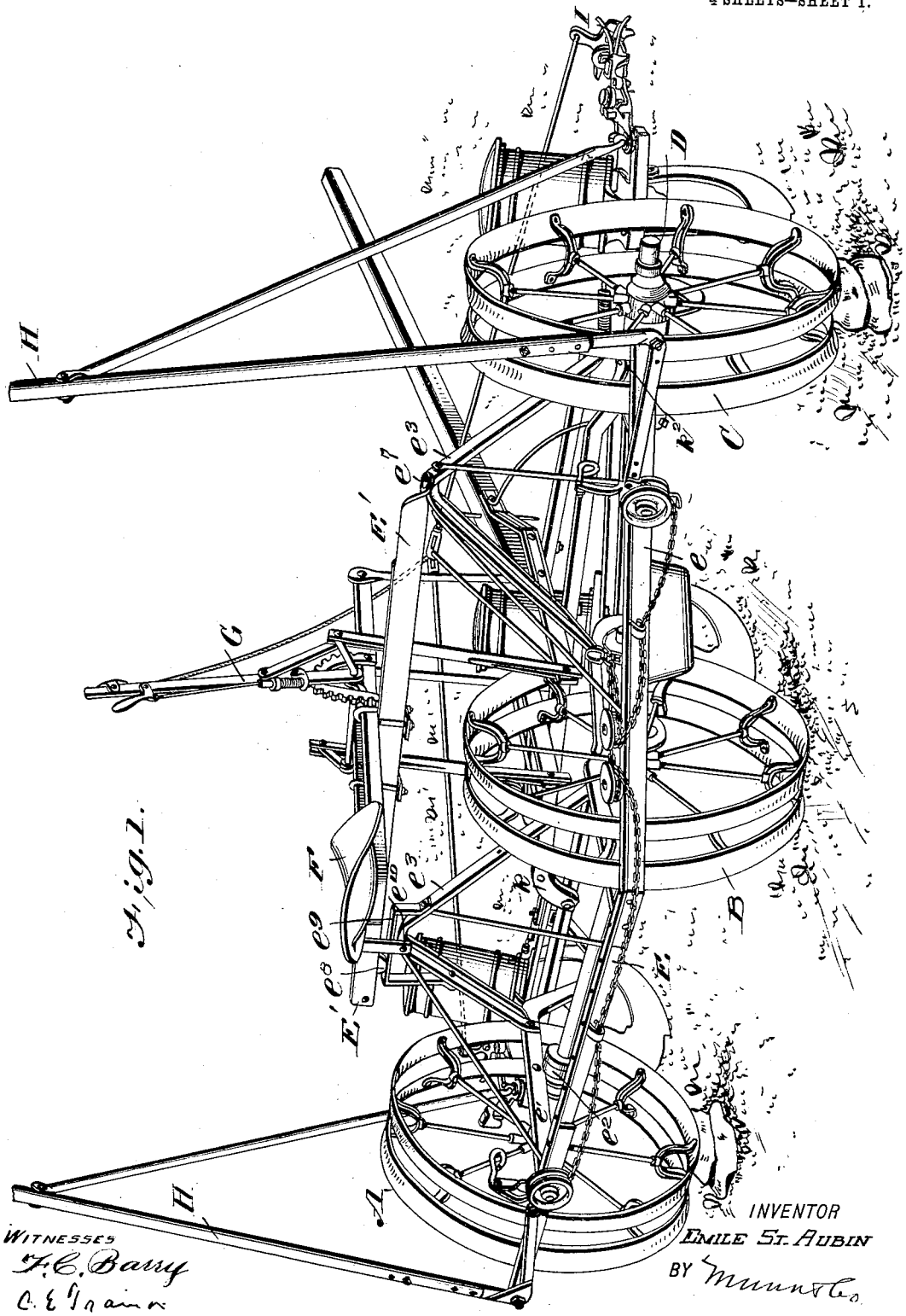
INVENTOR
EMILE ST. AUBIN
BY Munn & Co.
ATTORNEYS
WITNESSES
F. C. Barry
C. E. Train

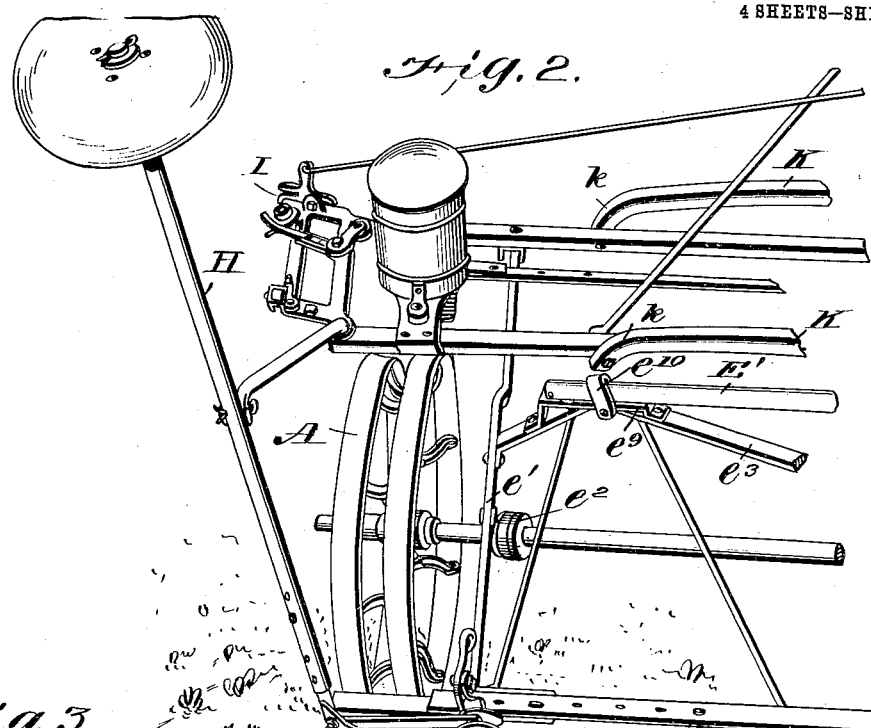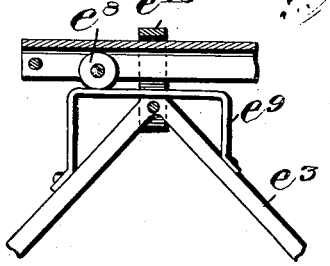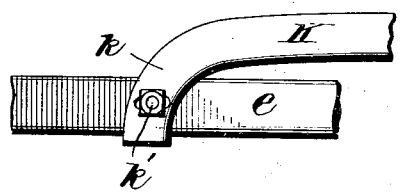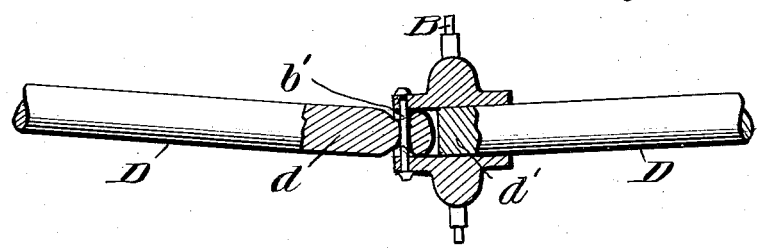

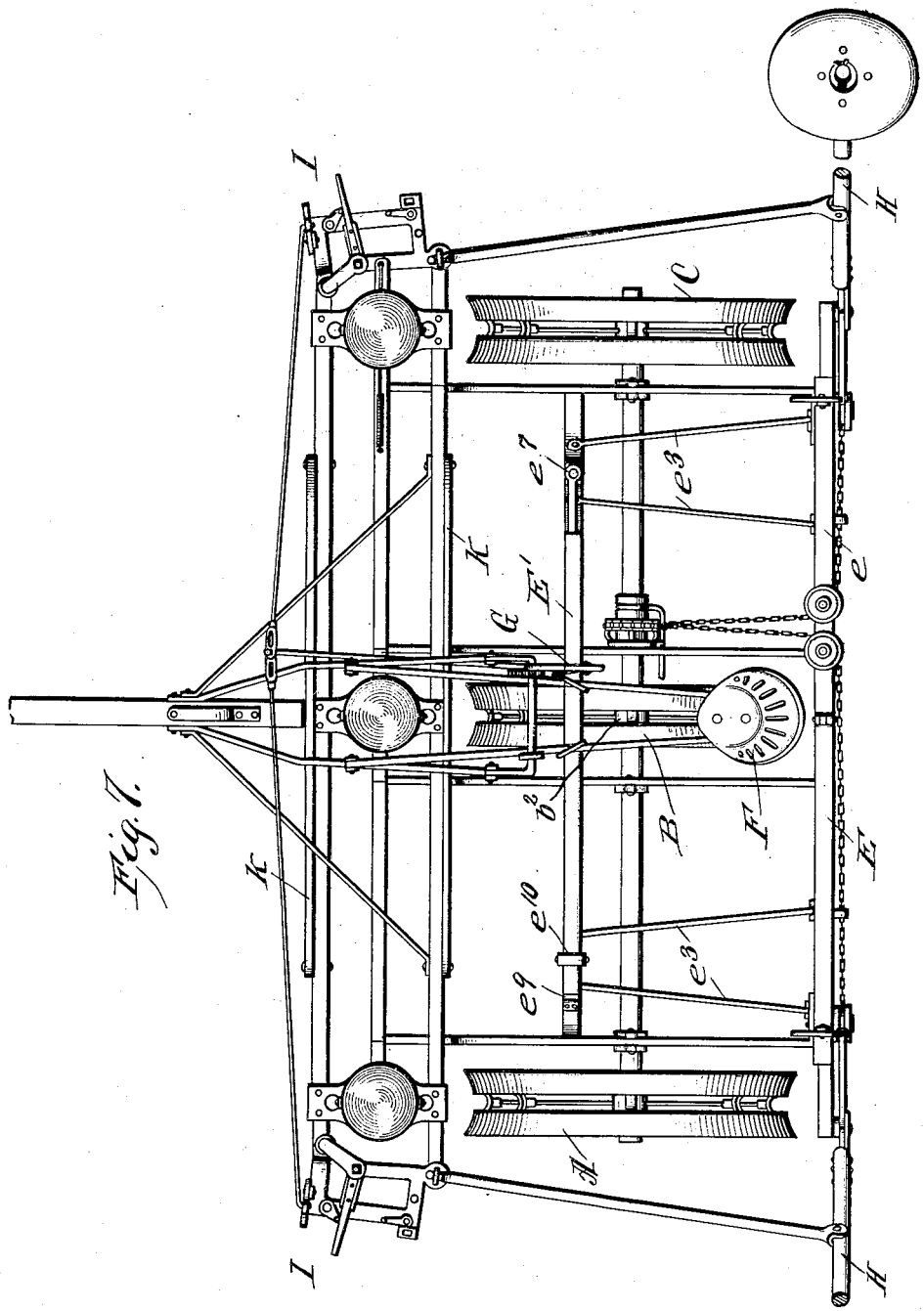

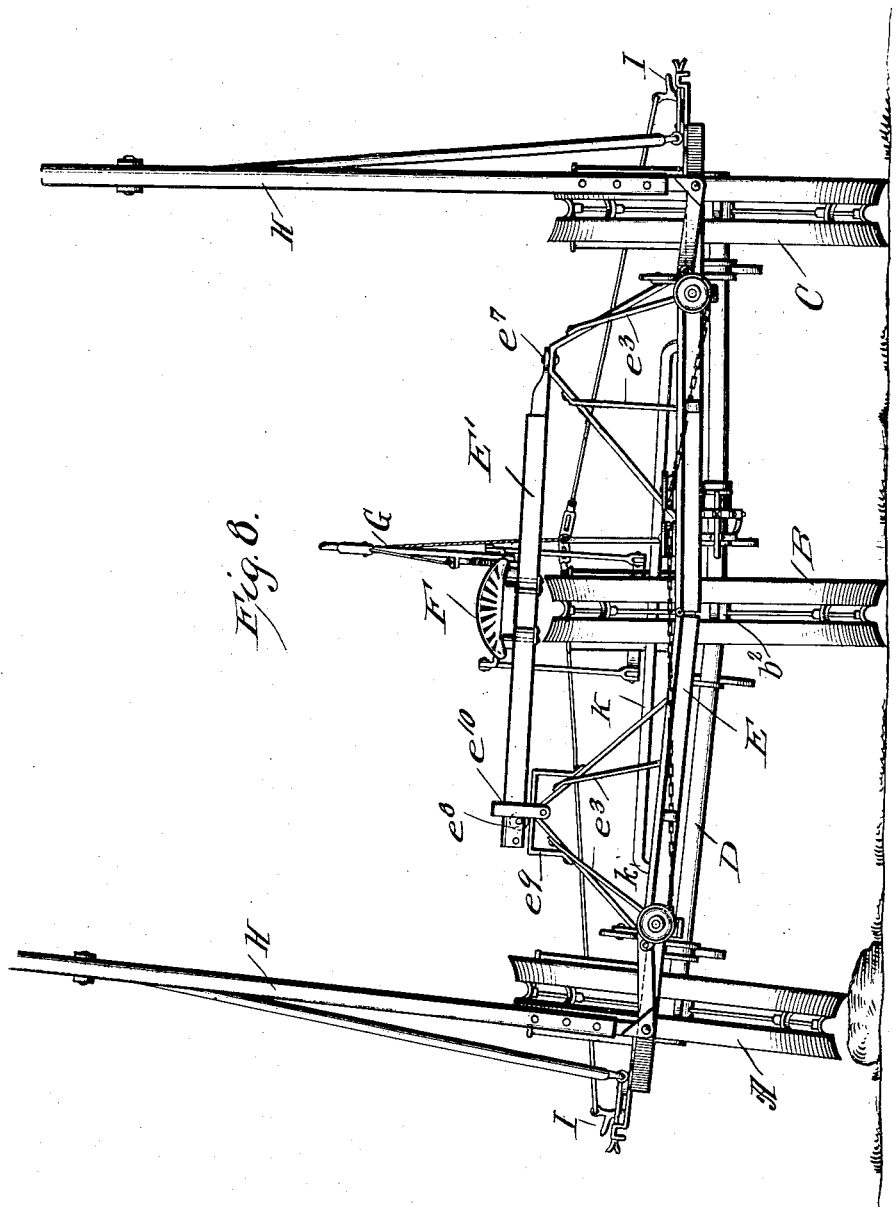

UNITED STATES PATENT OFFICE.

EMILE ST. AUBIN, OF GANEER TOWNSHIP, KANKAKEE COUNTY, ILLINOIS.

PLANTER.

No. 914,890.　　　Specification of Letters Patent.　　　Patented March 9, 1909.

Application filed August 29, 1908. Serial No. 450,916.

*To all whom it may concern:*

Be it known that I, EMILE ST. AUBIN, a citizen of the United States, and a resident of Ganeer township, in the county of Kankakee and State of Illinois, have invented certain new and useful Improvements in Planters, of which the following is a specification.

My invention is an improvement in corn planters, and consists in certain novel constructions and combinations of parts hereinafter described and claimed.

The object of the invention is to provide a device for simultaneously planting three rows of corn, and arranged so that each of the planting devices will be at all times in engagement with the ground regardless of the inequalities in the surface thereof.

Referring to the drawings forming a part hereof, Figure 1 is a perspective view of the improvement looking in at the rear. Fig. 2 is a similar view of one end thereof looking in from the rear. Fig. 3 is a detail sectional view of a portion of the frame. Fig. 4 is a similar view of another portion. Fig. 5 is a detail sectional view of a portion of the shaft. Fig. 6 is a plan view of a portion of the frame showing the manner of connecting the sections thereof. Fig. 7 is a top plan view, and Fig. 8 is a rear view.

The present embodiment of my invention comprises three covering and carrying wheels A, B, C, the wheel B being arranged intermediate the wheels A and C. A shaft or axle D is provided upon which all of the wheels are secured, and a frame E is supported by the shaft. The shaft D is divided within the hub of the intermediate wheel B, and one of the ends $d$ is provided with a transverse opening therethrough, through which passes a bolt $b'$ which also traverses the hub $b^2$ of the wheel, and the other end is secured within the hub in any suitable manner.

The frame E comprises a substantially rectangular portion, having side members $e$, and end members $e'$ provided with bearings $e^2$ in which the shaft D is journaled and an auxiliary frame E' supported at each end by brackets $e^3$ connected with the rectangular portion before described. The side members $e$ of the rectangular portion of the frame are divided at their center into sections, one of which is provided with a knuckle $e^4$ which is received between spaced knuckles $e^5$ on the other section, and a rivet or bolt $e^6$ traverses alined openings in the knuckles for securing the sections together. It will be evident from the description that the two ends of the frame may move vertically with respect to each other, this movement being permitted by the knuckle joint between the sections.

The auxiliary frame E' consists of a horizontal channel shaped bar having one of its ends secured to one of the brackets $e^3$ as at $e^7$, and at the other end the bar is provided with a roller $e^8$ arranged within the channel, the said roller engaging a track $e^9$, which is secured to the other bracket $e^3$, the said track being flat as shown in Fig. 3, and a stirrup $e^{10}$ secured to the bracket $e^3$, incloses the track and the channel shaped bar.

It will be evident from the description, that when the intermediate wheel moves up or down with respect to the outer wheels, the channel shaped bar will move through the stirrup $e^{10}$ in one direction or the other, thus permitting the free vertical movement of the intermediate wheel, while at the same time forming a firm support for the seat F, and the operating mechanism G for the markers H and the droppers I.

The planting mechanism forms no part of the invention for which reason it is not thought necessary to further describe the same.

A bar K is arranged at the front of the rectangular portion of the frame E, and one end of the bar is provided with a curved portion or elbow $k$, which is pivoted by a pin and slot or lost motion connection $k^1$ with one section of the front side member $e$ of the frame, and the other end is secured to the other section of the side member as at $k^2$.

The above arrangement limits the movement of the sections with respect to each other.

I claim.

1. A corn planter comprising a shaft divided at its center into sections, the sections being hinged together, wheels mounted on the shaft at each end and at its center, the hinged connection of the sections of the shaft being within the hub of the intermediate wheel, a frame supported on the shaft, said frame having a horizontal substantially rectangular portion divided into sections, the sections being hinged together, brackets secured to the ends of the rectangular portion, a bar connecting the brackets, said bar being rigidly connected with one of the brackets and having a sliding connection with the other for the purpose set forth, and dropping mechanism supported by the frame adjacent to each wheel.

2. A corn planter comprising a shaft divided at its center, the sections being hinged together, wheels secured to the shaft at each end and at its center, the intermediate wheel inclosing the hinged connection of the shaft, a frame supported on the shaft, and divided at its center into sections, the sections being hinged together, the hinged connection of the frame being in alinement with the hinged connection of the shaft, a bar arranged parallel with the shaft, one end of said bar being rigidly connected with the adjacent frame section, and the other end having a sliding connection with the other frame section, and dropping mechanism supported by the frame adjacent to each wheel.

3. A corn planter comprising a shaft divided centrally into sections, the sections being hinged together a wheel mounted on the shaft, at each end and at its center, the hinged connection of the sections being arranged with the hub of the intermediate wheel, a frame comprising hinged sections supported on the shaft, the connection of the sections being in alinement with the connections of the shaft sections, and dropping mechanism supported by the frame adjacent to each wheel.

4. A corn planter comprising a sectional frame, the sections of the frame being hinged together, wheels journaled on the frame near each end and adjacent to the hinged connection, bracket on each section of the frame, a bar having a rigid connection with one bracket, and a sliding connection with the other, and dropping mechanism supported by the frame adjacent to each wheel.

5. A corn planter comprising a frame composed of a plurality of hinged sections, wheels at the end of the frame, and at the connection of the section, a bar having one end rigidly connected with one section, and slidably connected with the other section, and dropping mechanism supported by the frame adjacent to each wheel.

6. A corn planter comprising a plurality of hinged sections, wheels at the end of the frame, and at the connection of the section, a bar having one end rigidly connected with one section, and slidably connected with the other section, means for limiting the movement of the sections with respect to each other, and dropping mechanism supported by the frame adjacent to each wheel.

7. In a corn planter, a frame, a covering wheel at each end of the frame, and at the center thereof, means in connection with the frame whereby to permit the wheels to move vertically with respect to each other, means for limiting the movement of the sections with respect to each other, and dropping mechanism supported by the frame adjacent to each wheel.

EMILE ST. AUBIN.

Witnesses:
A. L. GRANGER,
EUGENE ENOS.